Patented Oct. 11, 1927.

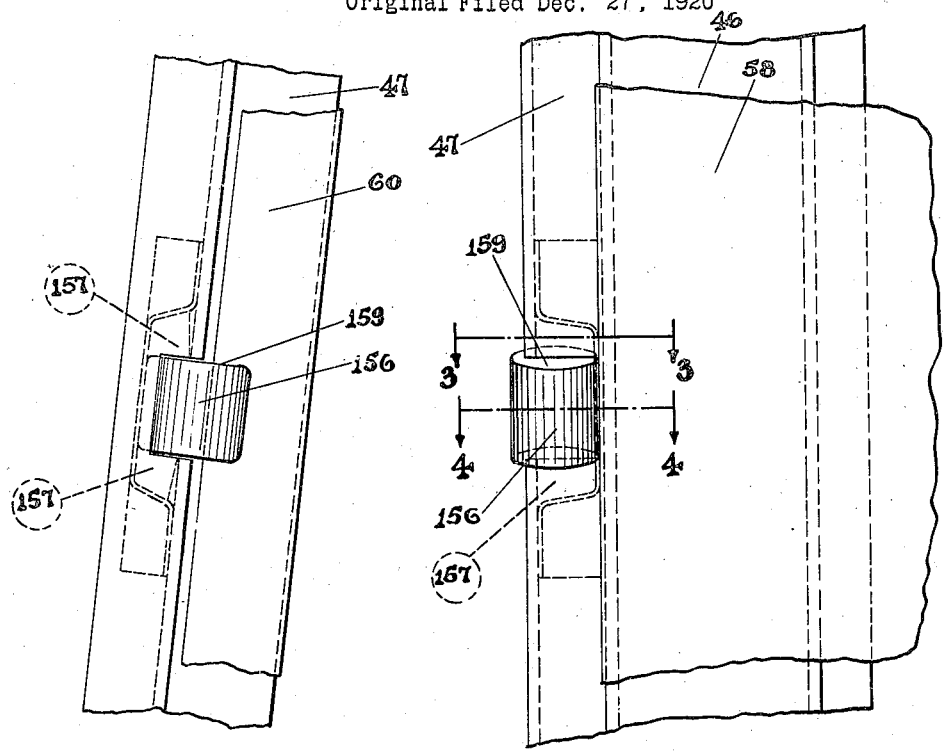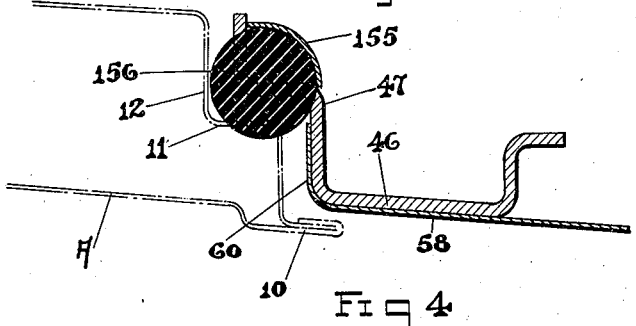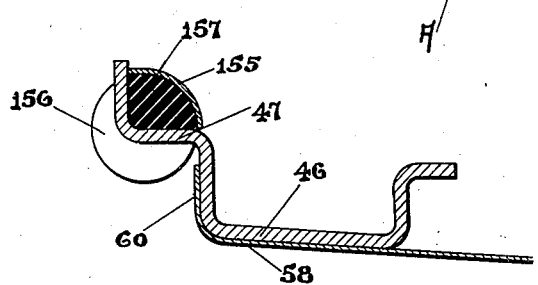

1,644,679

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

BUFFER FOR AUTOMOBILE DOORS.

Original application filed December 27, 1920, Serial No. 433,379. Divided and this application filed November 17, 1922. Serial No. 601,635.

My invention relates to improvements in buffers for automobile doors. This application is a division of my pending application for automobile bodies and the method of making same, Serial No. 433,379, filed December 27, 1920.

One of the leading objects of my invention is to provide an improved means for preventing the rattling of the doors of an automobile body.

A further object of my invention is to provide a buffer construction for automobile doors which will absorb vibrations both transversely and longitudinally of the body.

A further object of my invention is to provide a buffer construction for automobile doors which can be constructed very cheaply and mounted in place very quickly and easily.

Another object of my invention is to provide a buffer construction for automobile doors which is particularly suitable for mounting in a metal door post such as is used, for instance, in an automobile body constructed entirely of metal.

Further objects, and objects relating to details and economies of construction and operation will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is an edge view of one of the door posts of an automobile body, showing the mounting of my improved buffer therein.

Fig. 2 is a similar view showing a portion of the door post in side elevation.

Fig. 3 is a detail, sectional view taken on the line 3—3 of Fig. 2, and

Fig. 4 is a detail, sectional view taken on the line 4—4 of Fig. 2.

In the drawings, the same reference numerals refer to the same parts throughout the several views and the sectional views are taken looking in the direction of the arrows at the ends of the section lines.

An automobile body is subject, in use, to many vibrations, which set up an annoying rattle between the doors and the body unless some means are provided for preventing the rattling of the doors. Buffers, or anti-rattling devices, have been provided heretofore for automobile doors but, so far as I am aware, these anti-rattling devices have all been of such a character as to absorb only the vibrations, or movements of the door relative to the body, in directions longitudinally of the body and they have not been of such a nature as to prevent the rattling caused by vibrations transversely as well as longitudinally of the body. It is the purpose of my present invention to provide a door buffer construction which will be more efficient and satisfactory than prior devices of this nature because it absorbs vibrations both transversely and longitudinally of the body and entirely prevents the rattling of the doors. In automobile body construction, it is customary to provide the door post, which is engaged by the free edge of the door, with an angular portion forming a stop shoulder which is engaged by a corresponding shoulder of the door. In carrying out the purposes of my invention, I propose to provide a resilient buffer member in the angular portion of the door post, so that a portion of this buffer member projects from the angular portion of the door post in position to be engaged by a surface on the door extending transversely with respect to the body and another surface on the door which extends longitudinally with respect to the body, with the result that movements of the door both longitudinally and transversely are cushioned and restrained by this buffer member. In mounting the buffer member in a metal door post, I find it very convenient to form an opening in the angular portion of such metal door post and to mount the resilient buffer member in said opening. Suitable means may be provided for retaining the buffer member in its position in such opening. The buffer may well be made of any suitable material, such, for instance, as rubber and provided with projecting shoulders, which engage behind the door post above and below the opening formed in the angular portion thereof. This provides a very simple means for retaining the buffer member in position and, at the same time, permits of its insertion in the door post very quickly and easily.

In the accompanying drawings, I have illustrated a construction embodying the principles of my invention. Referring to these drawings, the metal door post, 46, has a portion of angular cross section forming a stop shoulder, 47. An opening, 159, is formed in the angular door post, 46, and the resilient buffer member, 156, is inserted in this opening, 159. The body portion of this buffer member may have any desired shape. In the example illustrated I have shown a cylindrical body portion and it may be made of rubber, or other suitable resilient material. Any suitable means may be provided for retaining this resilient buffer member, 156, in position in the opening formed in the angular portion of the door post. In this particular instance, I accomplish it by providing the longitudinally-extending portions, 157, on the ends of the resilient buffer member, 156, which portions, 157, are inserted behind the angular portion of the door post, above and below the opening, to retain the buffer member in place. The buffer member may be distorted so as to insert it in the opening and allow the end portions to lodge behind the angular portion of the door post when the buffer member resumes its normal position. I have found it desirable to provide a seat against which the inner portion of the buffer member engages so as to provide a backing for the buffer member. For this purpose, I have provided, in the construction illustrated, a sheet metal member which is secured to the inner portion of the door post, 46, and has a convex seat, 155, behind the opening, 159, in position to be engaged by the cylindrical buffer member when it is inserted in position.

In Fig. 4, the door is shown in dotted lines, in closed position, and it is to be noted that the resilient buffer member is somewhat compressed and distorted from its normal shape when the door is closed. The door, A, is provided with an edge flange, 10, and the free edge of the door is offset to provide a stop shoulder corresponding with the stop shoulder, 47, of the door post. This stop shoulder on the door comprises the surface, 11, extending longitudinally with respect to the body and the surface, 12, which extends transversely with respect to the body. It will be observed that the resilient buffer member, 156, projects from the door post so as to engage both the surfaces 11 and 12, with the result that a portion of the resilient buffer member is disposed between each of these surfaces and the door post. The result is that the buffer member acts to cushion vibrations or relative movements of the door and body both transversely and longitudinally of the body. The result is that my improved buffer construction is particularly effective to prevent rattling of automobile doors, inasmuch as it absorbs vibrations in all directions. The construction is particularly simple, can be manufactured very cheaply and can be inserted in position in the door post very quickly and easily.

I am aware that the particular construction illustrated in the accompanying drawing is susceptible of considerable variation, without departing from the spirit of my invention, and, therefore, I desire to claim my invention broadly, as indicated by the appended claims.

Having thus described my invention, what I claim as new and useful and desire to secure by Letters Patent is:

1. In an automobile body, the combination of a metal door post having an integral portion thereof of angular cross section to form a door stop, said angular portion having an opening formed therein, a seating member attached to the inner surface of said door post behind said opening, and a resilient buffer member disposed in said opening to protrude therethrough and seated against said seating member, said buffer member having longitudinally extending end portions lodged behind the angular portion of said door post above and below said opening to retain the same in place.

2. In an automobile body, a metal door post having an integral portion thereof of angular cross section to form a door stop, said angular portion having an opening therein adapted to receive a resilient buffer member, and a seating member fastened to the inner surface of said door stop behind said opening and forming a seat for the buffer member, said buffer member having end extensions to engage the inner surface of the post to retain the same in its seat.

3. In an automobile body, a door post having an angular portion forming a stop for the door and a buffer mounted in said angular portion to absorb vibrations both longitudinally and transversely of the body, said buffer having end extensions to engage the inner surface of said post to retain the same in place.

4. Means for preventing the rattling of automobile doors comprising a door post having an integral portion thereof of angular cross section to form a door stop, said angular portion having an opening therein, and a resilient buffer member mounted to protrude through said opening, and having means at its ends to engage the inner surface of said post to retain the same in place.

5. Means for preventing the rattling of automobile doors comprising a door post having an angular portion forming a door stop cooperating with a corresponding angular portion on the door, said angular portion of the door post having an opening formed therein, a resilient buffer member mounted in said opening and projecting in position to be engaged by the angular portion of said door, and having end extensions engaging with the interior surface of the post for retaining said buffer member in position.

6. In an automobile body, the combination of a metallic door post having a portion thereof of angular cross section to form a door stop, said portion having an opening therein, a buffer retaining plate of convex curvature fastened to the inner surface of said angular portion whereby to provide a chamber of substantially triangular cross section, with a buffer member having a body member positioned in said opening and oppositely extending portions of substantially triangular cross section positioned in oppositely disposed ends of said triangularly shaped chamber.

In testimony whereof, I affix my signature.

JOSEPH LEDWINKA.